(12) United States Patent
Kimura

(10) Patent No.: US 6,457,243 B2
(45) Date of Patent: Oct. 1, 2002

(54) TOOL CHUCK FOR A HAND-HELD POWER-DRIVEN PUNCHING MACHINE OR THE LIKE

(75) Inventor: Kiyoshi Kimura, Fujisawa (JP)

(73) Assignee: Kabushiki Kaisha Ogura, Kanagawa-Ken (JP)

( * ) Notice: Subject to any disclaimer, the term of this patent is extended or adjusted under 35 U.S.C. 154(b) by 0 days.

(21) Appl. No.: 09/897,447

(22) Filed: Jul. 3, 2001

(30) Foreign Application Priority Data

Jul. 7, 2000 (JP) ........................................ 2000-004801

(51) Int. Cl.⁷ .................................................. B26F 1/34
(52) U.S. Cl. ............................... 30/360; 30/358; 279/75
(58) Field of Search ......................... 30/360, 210, 358; 279/50, 146, 2.23, 74, 75, 904, 905

(56) References Cited

U.S. PATENT DOCUMENTS 3,622,169 A * 11/1971 Koch ........................... 279/89
3,863,341 A * 2/1975 Ramer ......................... 30/358

* cited by examiner

Primary Examiner—Douglas D. Watts
(74) Attorney, Agent, or Firm—Dickstein Shapiro Morin & Oshinsky LLP

(57) ABSTRACT

A punching machine has a power-driven plunger to which a punch is chucked to be driven into and out of a die for perforating sheet-metal work. The plunger has a punch socket formed centrally in its end for receiving the shank of the punch, and a plurality of ball guideways extending radially outwardly from the punch socket. Locking balls are slidably received one in each ball guideway for movement into and out of locking engagement in an annular groove in the shank of the punch received in the punch socket. Concentrically mounted on the plunger, a cam ring is sprung in one axial direction of the plunger for urging the locking balls into locking engagement with the punch shank. Each locking ball is elongated radially of the plunger with a view to reduction of the machine dimension axially of the plunger for given diameters of the plunger and the punch.

2 Claims, 3 Drawing Sheets

TOOL CHUCK FOR A HAND-HELD POWER-DRIVEN PUNCHING MACHINE OR THE LIKE

BACKGROUND OF THE INVENTION

This invention relates to punching machines for use with replaceable tools, and particularly to a hand-held, power-driven punching machine suitable for perforating sheet-metal work at sites of construction, among other applications. More particularly, the invention deals with improvements in or relating to a chuck for detachably mounting a punch or other tool to the punching machine.

Conventionally, for chucking a tool to the plunger or ram of punching machines or punch presses, it has been known to employ a set of locking balls slidably received one in each of several ball guideways extending radially outwardly from a tool socket which is cut centrally in one end of the plunger or ram. The tool socket is to have the shank of the tool inserted therein. Concentrically fitted over the plunger, a cam ring is movable axially thereof in sliding engagement with the locking balls protruding partly from the ball guideways, for forcing the balls into an annular groove in the tool shank. The tool is firmly coupled to the plunger in coaxial relationship thereto as all the locking balls are cammed into locking engagement in the groove in the tool shank.

An objection to this familiar tool chuck is that the locking balls as heretofore made have each been truly spherical in shape. The spherical locking balls have rendered the axial dimension of the plunger unnecessarily long for given diameters of the plunger and the tool shank. In hand-held, power-driven punching machines of the kind under consideration, the distance is narrowly limited between the punch in its normal, retracted position and the die. The unnecessarily long plunger has therefore resulted in an unnecessarily long dimension of the machine itself in the axial direction of the plunger.

A known solution to this inconvenience has been the use of screw-type chucks. This alternative type of chucks has, however, a serious drawback of rather readily loosening in use, as the impact of punching is repeatedly exerted thereon. The screw threads of the loose chucks have been easy to be irrecoverably destroyed.

SUMMARY OF THE INVENTION

The present invention seeks, in a tool chuck for a punching machine of the kind defined, to make the axial dimension of the chuck less than heretofore for given diameters of the plunger and the tool shank, by making use of preexisting parts only and without in any way adversely affecting the performance or handling of the machine.

Briefly, the present invention may be summarized as a chuck for detachably mounting a tool to a punching machine. Included is a plunger reciprocable axially thereof, the plunger having a tool socket formed in one end thereof for receiving the shank of a tool, and a plurality of ball guideways extending axially outwardly from the tool socket. Locking balls are slidably received one in each ball guideway for movement into and out of locking engagement in an annular groove in the tool shank received in the tool socket. Each locking ball is elongated radially of the plunger, or longitudinally of one ball guideway in which it is received. A cam ring is concentrically mounted on the plunger and movable axially thereof for urging the locking balls into locking engagement in the annular groove in the tool shank.

The invention particularly features the fact that the locking balls are each elongated radially of the plunger, which is tantamount to saying that the locking balls are compressed axially of the plunger. Therefore, for given diameters of the plunger and the tool shank, the dimension of the machine in the axial direction of the plunger can be made correspondingly less than if the balls were truly spherical as in the prior art. Despite the improved shape of the locking balls, moreover, the tool chuck has its field-proven performance intact, permitting the tool to be readily mounted to, and dismounted from, the punching machine, and positively holding the tool in the face of the impact of punching operations.

The present invention further features the fact that the plunger is adapted for easy withdrawal of the tool shank from the tool socket in the event of accidental deformation of the tool shank in the tool socket. For such tool shank withdrawal, the plunger is formed to include an annular enlargement of the tool socket between the ball guideways and one end of the plunger for ease of withdrawal of the tool shank from the tool socket in one embodiment of the invention. In another embodiment the plunger has a plurality of escape passageways which are open to the tool socket and which extend one between each ball guideway and one end of the plunger for ease of withdrawal of the tool shank from the tool socket.

The above and other objects, features, and advantages of this invention will become more apparent, and the invention itself will best be understood, from a study of the following description taken together with the attached drawings showing some preferred embodiments of the invention.

DESCRIPTION OF THE PREFERRED EMBODIMENTS

Figure 1:
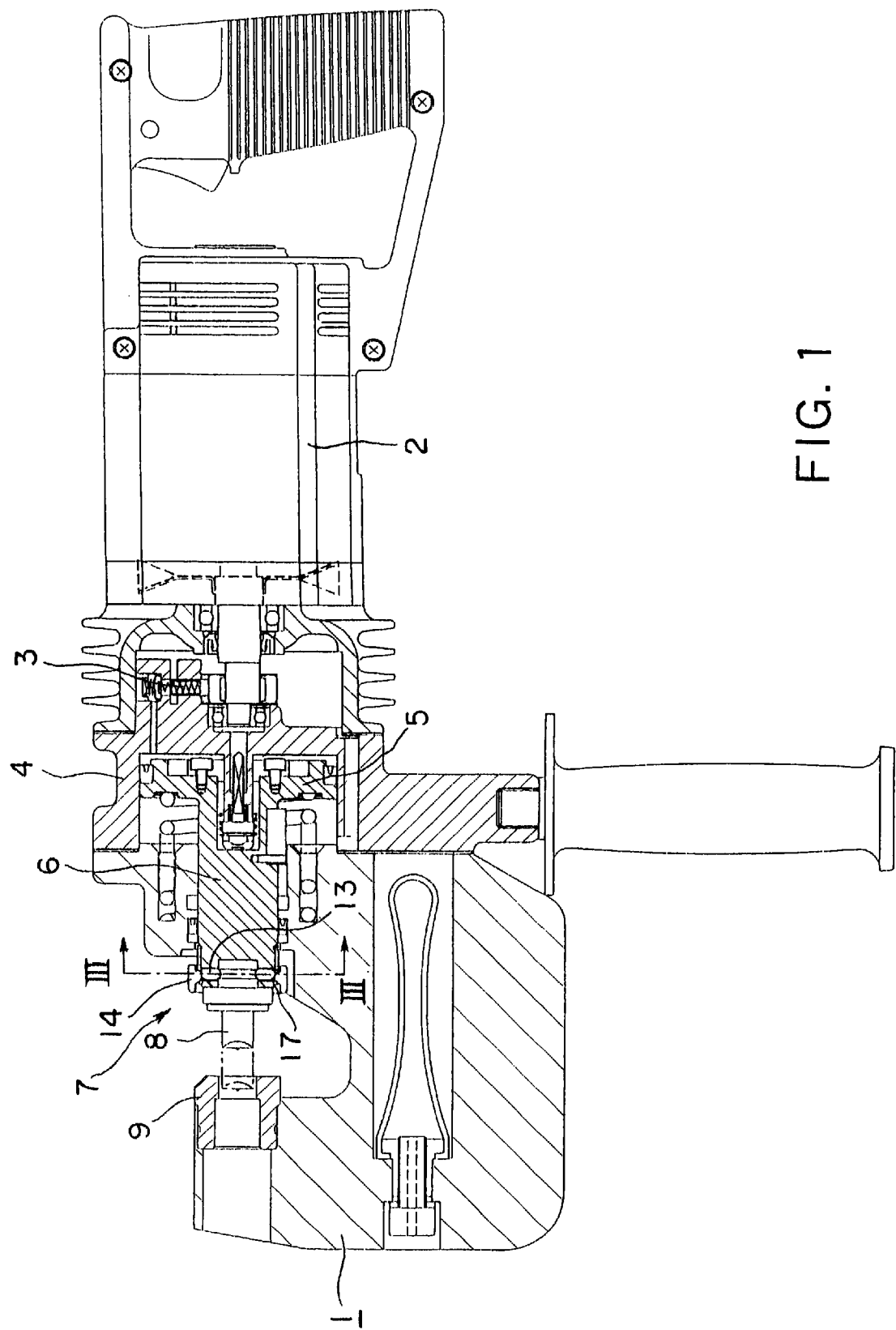
FIG. 1 is a side elevation, partly shown broken away to reveal the inside details, of the hand-held, power-driven punching machine incorporating the novel concepts of this invention.

The present invention is believed to be best embodied in the hand-held, power-driven punching machine depicted in FIG. 1. The exemplified punching machine has a body 1 having mounted therein an electric drive motor 2 drivingly coupled to a hydraulic pump 3. Also mounted in the machine body 1 is a hydraulic cylinder 4 having reciprocably mounted therein a piston 5 defining a pair of opposed fluid chambers. The piston 5 will travel back and forth within the cylinder 4 as a fluid, usually a hydraulic oil, is delivered under pressure from the pump 3 alternately to the opposed fluid chambers of the cylinder 4.

A piston rod 6, another component of the hydraulic cylinder 4, extends forwardly, or to the left as viewed in FIG. 1, from the piston 5 and projects outwardly of the machine body 1. The piston rod 6 has a tool chuck 7 by which a tool such as a perforating punch 8 is coaxially and detachably coupled to the piston rod. Chucked to the piston rod 6, the punch 8 is to be normally held retracted away from a die 9, which is mounted fast to the machine body 1, as indicated by the solid lines in FIG. 1. Upon extension of the piston rod 6, the punch 8 will be thereby thrust into the die 9, as indicated by the broken lines in the same figure, for perforating sheet-metal work. Thus the piston rod 6 serves as a plunger and will be so referred to hereinafter in this specification.

Figure 2:
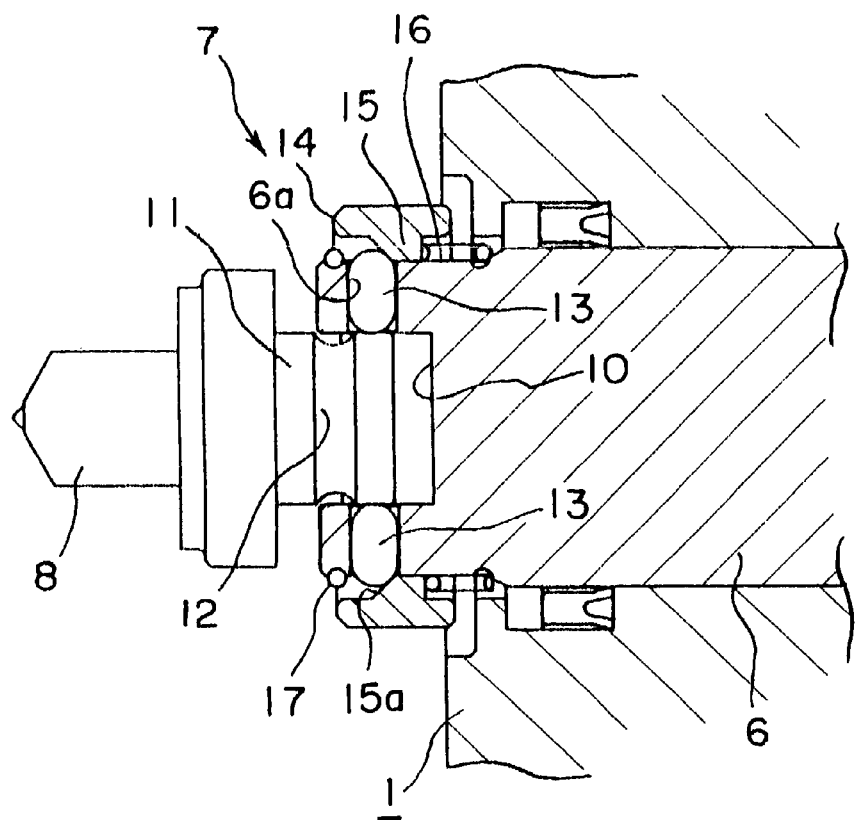
FIG. 2 is an enlarged, fragmentary section through the punching machine of FIG. 1, the view showing in particular the chuck for detachably coupling the punch to the plunger.
Figure 3:
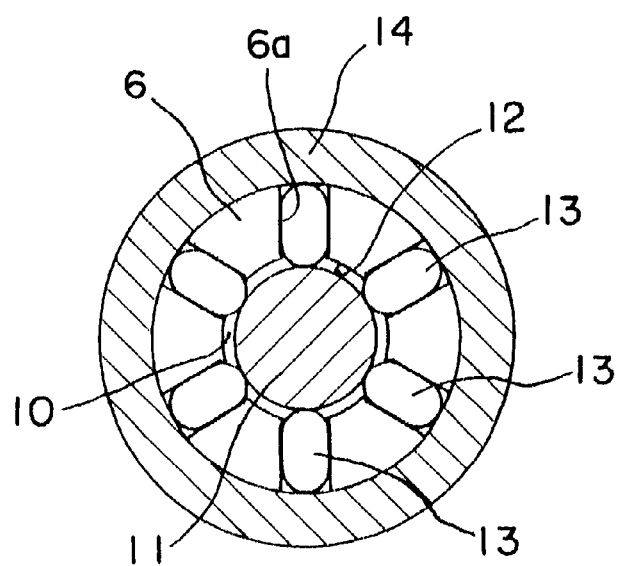
FIG. 3 is an enlarged section taken along the line III—III in FIG. 1 and also showing the chuck.

As illustrated on an enlarged scale in FIGS. 2 and 3, the punch 8 is chucked to the plunger 6 by having its shank 11 inserted in a punch or tool socket 10 bored centrally in the exposed end of the plunger 6. Extending radially outwardly from the punch socket 10 are a plurality of, six in this particular embodiment, ball guideways 6a which are disposed at constant angular spacings.

The chuck 7 comprises a set of locking balls 13 slidably received one in each ball guideway 6a for movement into and out of locking engagement in an annular groove 12 cut in the surface of the punch shank 11. The annular groove 12 is shaped like a shallow bowl in cross section so that the locking balls 13 may smoothly ride into and out of the groove as the punch shank 11 is inserted in or withdrawn from the punch socket 10.

Each locking ball 13 is not spherical but, according to a feature of the instant invention, elongated radially of the plunger 6, or longitudinally of the ball guideway 6a in which it is received.

In FIG. 1, as well as in FIG. 3, the punch shank 11 is shown fully inserted in the punch socket 10, with the locking balls 13 bottomed against the annular groove 12 in the punch shank. The punch 8 is then locked, firmly chucked to the plunger 6, and ready for punching. FIG. 2, on the other hand, shows the punch shank 11 not fully inserted in the punch socket 10, so that the annular groove 12 in the punch shank is not in a position to be engaged by the locking balls 13. The punch 8 is unlocked. It will be observed from FIGS. 1–3 that the longitudinal dimension of the locking balls 13 are somewhat more than the length of the ball guideways 6a.

Concentrically fitted over the plunger 6 is a cam ring 14 which is movable axially of the plunger. The cam ring 14 is formed to include a ledge 15 on its inside surface to provide a cam contour 15a in sliding engagement with all the locking balls 13 protruding from the ball guideways 6a. The cam contour 15a is such that the locking balls 13 will be urged radially inwardly of the plunger 6, and into locking engagement in the annular groove 12 in the punch shank 11, when the cam ring 14 is forced forwardly of the plunger.

A helical compression spring 16 acts between plunger 6 and cam ring 14, biasing the latter forwardly of the former, that is, in the direction for forcing the locking balls 13 into locking engagement in the annular groove 12. A collar 17 is formed on the plunger 6 to limit the travel of the cam ring 14 under the bias of the compression spring 16, in such an axial position on the plunger that the locking balls 13 are held locked in the annular groove 12. In practice the collar 17 may be formed on the plunger 6 from so-called piano wire after the cam ring 14 has been mounted on the plunger.

In use of the punching machine constructed as hereinbefore described with reference to FIGS. 1–3, the machine operator may manually back up the cam ring 14 against the machine body in opposition to the bias of the compression spring 16 preparatory to insertion of the punch shank 11 in the punch socket 10 in the plunger 6. The locking balls 13 will then be free to travel in either direction along the ball guideways 6a.

Then, holding the cam ring 14 retracted as above, the operator may insert the punch shank 11 fully in the punch socket 10, until the annular groove 12 in the punch shank comes into register with the radial ball guideways 6a in the plunger 6. Then he may release the cam ring 14, thereby allowing the same to travel forwardly of the plunger 6 under the bias of the compression spring 16. While being so sprung forwardly into abutment against the collar 17, the cam ring 14 will push the locking balls 13 into locking engagement in the annular groove 12 in the punch shank 11 received in the punch socket 10.

Now has been completed the chucking of the punch 8 to the plunger 6. The cam ring 14 will stay in abutment against the collar 17 under the force of the compression spring 16, holding the locking balls 13 engaged in the annular groove 12 in the punch shank 11 and so causing the punch 8 held locked to the plunger 6 against axial displacement. It is understood that the compression spring 16 is sufficiently strong to keep the cam ring 14 in abutment against the collar 17 in the face of the impact to be exerted on the machine upon punching.

Since the locking balls 13 are elongated radially of the plunger 6 as aforesaid, and the ball guideways 6a made less in diameter than if the balls were spherical, the plunger can be correspondingly reduced in length. A sufficient space will therefore be provided between plunger 6 and die 9 for the mounting and dismounting of the punch 8 or other interchangeable tools.

Figure 4:
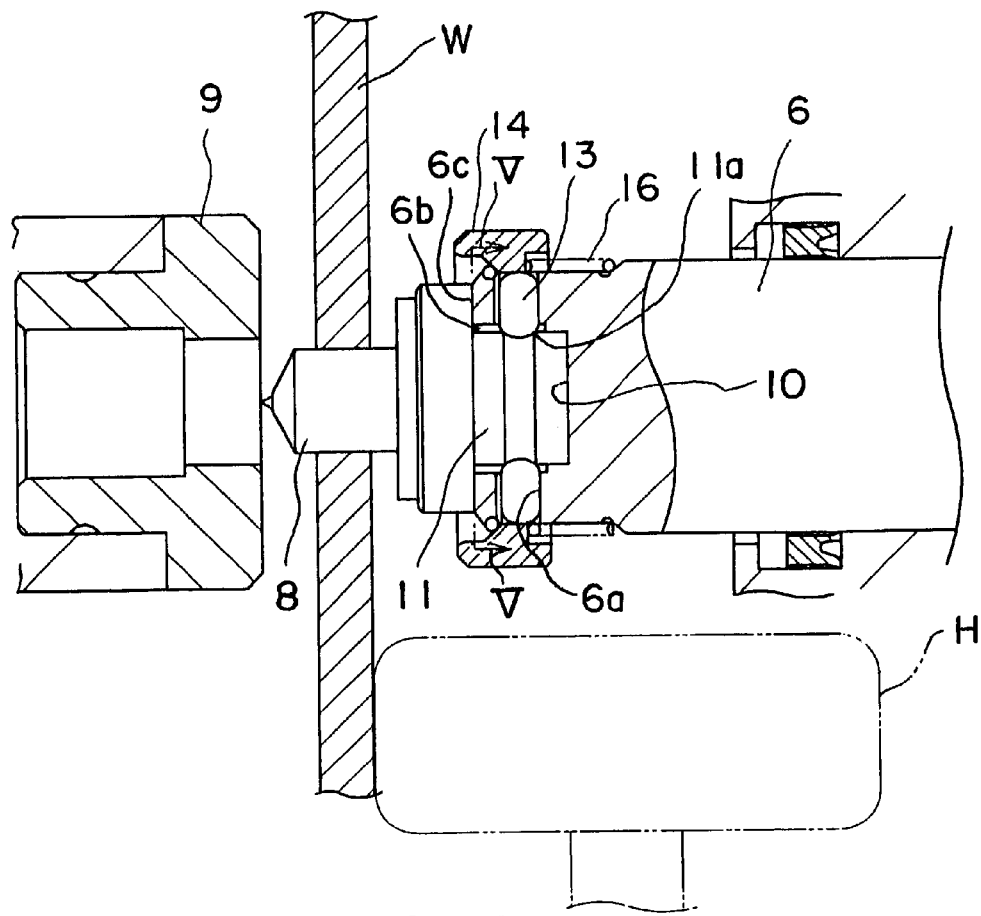
FIG. 4 is a view somewhat similar to FIG. 2 but showing an alternative form of punching machine according to the invention.
Figure 5:
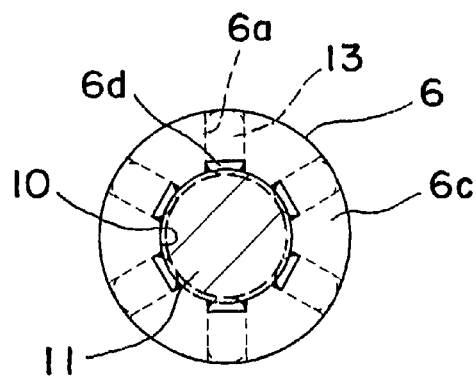
FIG. 5 is a view similar to FIG. 3 but showing another alternative form of punching machine according to the invention.

FIG. 4 is a partial illustration of a modified punching machine, in which the punch socket 10 in the plunger 6 is formed to include a radial escape enlargement 6b between the ball guideways 6a and the forward end 6c of the plunger. Alternatively, as indicated in FIG. 5, the plunger 6 may be formed therein a plurality of escape passageways 6d disposed radially outwardly of the punch socket 10 and extending one between each ball guideway 6a and the forward end 6c of the plunger. The escape enlargement 6b or escape passageways 6d are intended for the following purposes:

The need may arise in field use of the punching machine to punch work that is thicker than the thickness range for which the die 9 currently mounted to the machine is designed. For instance, a six-millimeter-thick piece of work may be punched with use of a die that is designed for work only three millimeters thick. Then the punch 8 may get stuck to the work W, resisting any bodily effort to withdraw.

As is frequently the case, the machine operator will then pound on the work W as with a hammer H to loosen out the punch. The impact of the hammering will be transmitted to the punch 8, possibly resulting in the bulging, by plastic deformation, of the shoulder 11a, FIG. 4, of the punch shank 11 which is being held against the locking balls 13. The punch will then become unwithdrawable from the punch socket 10 as its bulging parts are caught by the inside edges of the ball guideways 6a.

The embodiments of FIGS. 4 and 5 are intended to defeat this inconvenience. The punch 8 will be relatively easily disengaged from the plunger 6 as its bulging parts pass through the escape enlargement 6b or escape passageways 6d from the ball guideways 6a to the end 6c of the plunger 6

Notwithstanding the foregoing detailed disclosure it is not desired that the invention be limited by the exact showing of the drawings or the description thereof. A variety of modifications or alterations of the illustrated embodiments will suggest themselves to the specialists without departing from the scope of the claims which follow.

What is claimed is:

1. In a punching machine for use with a tool having a shank with an annular groove cut in its surface, a chuck for detachably mounting the tool to the punching machine, comprising:

(a) a reciprocating plunger having an axis;

(b) there being a tool socket formed in one end of the plunger for receiving the shank of the tool;

(c) there being a plurality of ball guideways formed in the plunger and extending radially outwardly from the tool socket;

(d) a plurality of locking balls slidably received one in each ball guideway in the plunger for movement into and out of locking engagement in the annular groove in the shank of the tool received in the tool socket in the plunger, each locking ball being elongated radially of the plunger; and (e) a cam ring concentrically mounted on the plunger and movable axially thereof for urging the locking balls into locking engagement in the annular groove in the shank of the tool, wherein the plunger has formed therein a plurality of escape passageways disposed radially outwardly of the tool socket and extending one between each ball guideway and said one end of the plunger for ease of withdrawal of the tool shank from the tool socket.

2. A hand-held, power-driven punching machine for use with a punch having a shank with an annular groove cut in its surface, the punching machine comprising:

(a) a body;

(b) a die mounted fast to the body;

(c) fluid-actuated cylinder means mounted to the body, the cylinder means having a plunger linearly reciprocable relative to the body toward and away from the die;

(d) there being a punch socket formed centrally in one end of the plunger for receiving the shank of the punch;

(e) there being a plurality of ball guideways formed in the plunger and extending radially outwardly from the punch socket;

(f) a plurality of locking balls slidably received one in each ball guideway in the plunger for movement into and out of locking engagement in the annular groove in the shank of the punch received in the punch socket in the plunger, each locking ball being elongated radially of the plunger; and (g) a cam ring concentrically mounted on the plunger and movable relative to the same in a traveling direction thereof for urging the locking balls into locking engagement in the annular groove in the shank of the punch, wherein the plunger has formed therein a plurality of escape passageways disposed radially outwardly of the punch socket and extending one between each ball guideway and said one end of the plunger for ease of withdrawal of the punch shank from the punch socket.

* * * * *